United States Patent [19]

Kobayashi et al.

[11] Patent Number: 5,086,203
[45] Date of Patent: Feb. 4, 1992

[54] WIRE ELECTRIC DISCHARGE MACHINING APPARATUS

[75] Inventors: Kazuo Kobayashi, Sagamihara; Hitoshi Miyahara, Yokohama; Hidemaru Nishikizawa, Hadano; Hironori Shimomoto; Osamu Maruyama, both of Ebina, all of Japan

[73] Assignee: Hitachi, Seiko, Ltd., Tokyo, Japan

[21] Appl. No.: 360,131

[22] Filed: Jun. 1, 1989

[30] Foreign Application Priority Data

Jun. 3, 1988 [JP] Japan .................................. 63-135531

[51] Int. Cl.⁵ .......................... B23H 7/02; B23H 7/26
[52] U.S. Cl. ................................ 219/69.12; 219/69.11
[58] Field of Search ................. 219/69.12, 69.16, 68, 219/69.11

[56] References Cited

U.S. PATENT DOCUMENTS

| | | | |
|---|---|---|---|
| 3,731,043 | 5/1973 | Ullmann et al. | 219/69.12 |
| 3,731,044 | 5/1973 | Ullmann et al. | 219/69.12 |
| 4,114,015 | 9/1978 | Vasiliev et al. | 219/69.12 |
| 4,733,041 | 3/1988 | Obara | 219/69.12 |
| 4,808,787 | 2/1989 | Futamura | 219/69.12 |

FOREIGN PATENT DOCUMENTS

| | | | |
|---|---|---|---|
| 2052123 | 6/1979 | Fed. Rep. of Germany. | |
| 3524377 | 1/1987 | Fed. Rep. of Germany. | |
| 62-84923 | 4/1987 | Japan | 219/69.12 |
| 62-213923 | 9/1987 | Japan | 219/69.16 |
| 2077649 | 12/1981 | United Kingdom | 219/69.12 |

*Primary Examiner*—Geaffrey S. Evans
*Attorney, Agent, or Firm*—Antonelli, Terry, Stout & Kraus

[57] ABSTRACT

A wire electric discharge machining apparatus wherein workpiece and a wire supported by a pair of guides are moved relative to each other in an X-axis direction and a Y-axis direction, one of the guides being moved relative to the other guide in two directions in a horizontal plane for performing a machining operation. The apparatus comprises the pair of guides, a frame, rails mounted on a column, a U-axis moving unit, and a V-axis moving unit. One of the guides is mounted on the frame. The V-axis moving unit on which the other guide is mounted is mounted movably on the U-axis moving unit in parallel with the Y-axis. The frame and the U-axis moving unit are arranged in alignment with the rails.

9 Claims, 3 Drawing Sheets

WIRE ELECTRIC DISCHARGE MACHINING APPARATUS

BACKGROUND OF THE INVENTION

The present invention relates to a wire electric discharge machining apparatus.

A conventional wire electric discharge machining apparatus, as shown in FIG. 3, includes a base 1, a table 2 and a linear guide means 3 for guiding the table 2. The linear guide means 3 is composed of rails 3a fixed to the base 1 and extending in a direction of a Y-axis thereto, and bearings 3b engaged with the rails 3a and mounted on the table 2. The table 2 is moved in the Y-axis direction relative to the base 1 through a feed screw connected to a motor 4 mounted on the base 1. A loading surface 5 of a work mounting base on which a workpiece 6 is loaded is set in parallel with the moving surface of the table 2. An inverted U-shaped column 7 is fixed to the base 1, with the column 7 having a linear guide means 9 for guiding a frame 8. The linear guide means 9 is composed of rails 9a fixed to column 7 and extending in an X-axis direction perpendicular to the Y-axis relative to the column 7, and bearings 9b engaged with the rails 9a and mounted on the frame 8. A motor 10 is mounted on the column 7 for moving the frame 8 in the X-axis direction relative to the column 7 through a feed screw. The frame 8 is C-shaped and carries a Z-axis quill 11 on its upper arm portion. The frame 8 carries, on its lower arm portion, a lower guide 13 having a nozzle for supplying a machining liquid in a coaxial manner with a wire 12 while guiding the wire 12. A motor 14 is mounted on the frame 8 for moving the Z-axis quill 11 through a feed screw in the Z-axis direction perpendicular to the X- and Y-axes relative to the frame 8. A flange 15 is mounted at a tip end of the Z-axis quill 11. A U-V axis moving unit 16, removable from the flange 15, has a V-axis moving means 17, a linear guide means 18 for guiding the V-axis moving means 17, a motor 19, a U-axis moving means 20, a linear guide means 21 for guiding a U-axis moving means 20 and a motor 22. The linear guide means 18 is composed of rails 18a fixed to the flange 15 and extending in a direction of a V-axis in parallel with the Y-axis relative to the flange 15, and bearings 18b engaged with the rails 18a and mounted on the V-axis moving means 17. A motor 19 is mounted on the flange 15 for moving the V-axis moving means 17 through a feed screw in the V-axis direction relative to the flange 15. A linear guide means 21 for guiding a U-axis moving means 20 is composed of rails 21a fixed to the V-axis moving means 17 and extending in a U-axis direction in parallel with the X-axis relative to the V-axis moving means 17, and bearings 21b engaged with the rails 21a and mounted on the U-axis moving unit 20. A motor 22 is mounted on the V-axis moving means 17 for moving the U-axis moving means 20 in the U-axis direction relative to the V-axis moving means 17. An upper guide 23 mounted on the U-V axis moving unit 16 has a nozzle for supplying a machining liquid in a coaxial manner with the wire 12 while guiding the wire 12 in the same manner as the lower guide 13. Incidentally, the reference position of the upper guide 23 is a vertical position relative to the lower guide 13, i.e., a position where the wire 12 is kept vertically to the loading surface 5. The frame 8 is provided with a reel 24 and a pair of takeup rollers 25. The wire 12 wound around the reel 24 is introduced into the upper guide 23 and is passed through the lower guide 13 to be wound by the rollers 25.

When a workpiece having parallel upper and lower surfaces 6 is loaded on the loading surface 5 and the upper guide 23 is set at the reference position, i.e. the starting point of machining, the wire 12 is held vertically to the upper surface of the work 6. In order to prevent any electric discharge in the air and to remove sludge generated during the machining operation, the machining liquid is supplied from the upper guide 23 and the lower guide 13 in the coaxial manner with the wire 12 and then an electric energy is supplied thereto. When the table 2 and the frame 8 are moved, respectively, the wire 12 and the workpiece 6 are relatively moved in the X- and Y-axis directions. Thus, it is possible to perform a so-called vertical machining in which the machined surface is kept vertically relative to the upper and lower surfaces of the work 6. In the same manner, when the relative position between the upper guide 23 and the lower guide 13 is changed by the U-V axis moving means 16 to impart an inclination to the wire 12, it is possible to perform a so-called inclined machining in which the machined surface is inclined relative to the upper and lower surfaces of the workpiece 6.

In order to enhance a machining precision, it is necessary to always hold the wire 12 in a predetermined position relative to the workpiece 6. Therefore, the column 7 and the frame 8 that are structural members have a structure as subjected to rigidity. Furthermore, the interval between the rails 3a is designed to be large and the linear guide means 3 is subjected to relatively large rigidity.

In general, the thickness of the work 6 is much smaller than the longitudinal and lateral dimensions, i.e., dimensions in the X- and Y-axis directions. Thus, the moving distances of the upper guide 23 in the U- and V-axis directions may be shortened. Also, if the type of machining is taken into consideration, there are many more cases in the vertical machining than in inclined machining. Further, if the V-axis moving means 17 and the U-axis moving means 20 are made small in size and light in weight, then it is possible to miniaturize the motors 19 and 22 and the linear guide means 18 and 21. As a result, it is possible to make the U-V axis moving unit 16 small in size and light in weight. Accordingly, it is economically advantageous that, for instance, a single U-V axis moving means 16 is provided for a plurality of wire electric discharge machines that are not provided with the U-V axis moving means, and when the inclined machining is necessary, the U-V axis moving means 16 is loaded on the wire electric discharge machine.

Recently, it has been necessary to enhance the machining speed as well as the machining precision. In order to increase the machining speed, it is necessary to supply the machining liquid to the parts to be machined, without fail. It is effective that the upper guide 23 and the lower guide 13 are close to each other as much as possible and the pressure of the machining liquid is increased.

However, the upper guide 23 is positioned through the four guide means, i.e., the linear guide means 9, 18 and 21 and the guide means for the Z-axis quill 11 with respect to the fixed column 7. Furthermore, since the linear guide means 18 and 21 are small in size, the rigidity thereof is low. Accordingly, if the high pressure machining liquid is supplied, the position of the upper guide 23 relative to the lower guide 13 is unduly offset or displaced due to the reaction of the machining liquid. Namely, the wire 12 is offset relative to the workpiece 6 to deteriorate the machining precision. If a sufficient rigidity would be applied to the U-V axis moving unit 16 in order to prevent the generation of the positional offset of the upper guide 23, the outer dimension thereof would be unduly increased, thereby the weight thereof. This would make it difficult to operate the unit and also, the guide means for the Z-axis quill 11 would be enlarged.

SUMMARY OF THE INVENTION

Accordingly, in order to overcome the abovenoted inherent problems in the prior art, it is an object of the present invention to provide a wire electric discharge machining apparatus which is capable of enhancing the machining speed as well as the machining precision.

In order to attain this and other objects, according to the present invention, an apparatus is provided in which a frame having a pair of bearings is guided by a pair of rails, a U-axis moving means is arranged inside of a recess formed in the frame, and the U-axis moving means carries the bearings and is guided by the rails. A motor mounted on the frame is adapted to move the U-axis moving means relative to the frame, and a V-axis moving means is provided with an upper guide mounted on a flange thereof.

If the upper guide is positioned in a reference position, i.e. the starting point of machining, and the frame and the table are moved, respectively, it is possible to perform a vertical machining. In the same manner, if the relative position of the upper guide with respect to the lower guide is changed by the U- and V-axis moving means, it is possible to perform an inclined machining. Then, the upper guide is positioned through three guide means, i.e., the two linear guide means and a single guide means for a Z-axis quill with respect to the column. According to the invention, it is possible to reduce the number of the guide means by one in comparison with the conventional apparatus. Furthermore, the linear guide means for the X-axis direction is used as the linear guide means for the U-axis direction, thus increasing the rigidity in comparison with the conventional apparatus. Therefore, even if the pressure of the machining liquid is increased, there is no fear that the position of the upper guide would be offset or displaced.

DETAILED DESCRIPTION OF THE PREFERRED EMBODIMENTS

Figure 1:
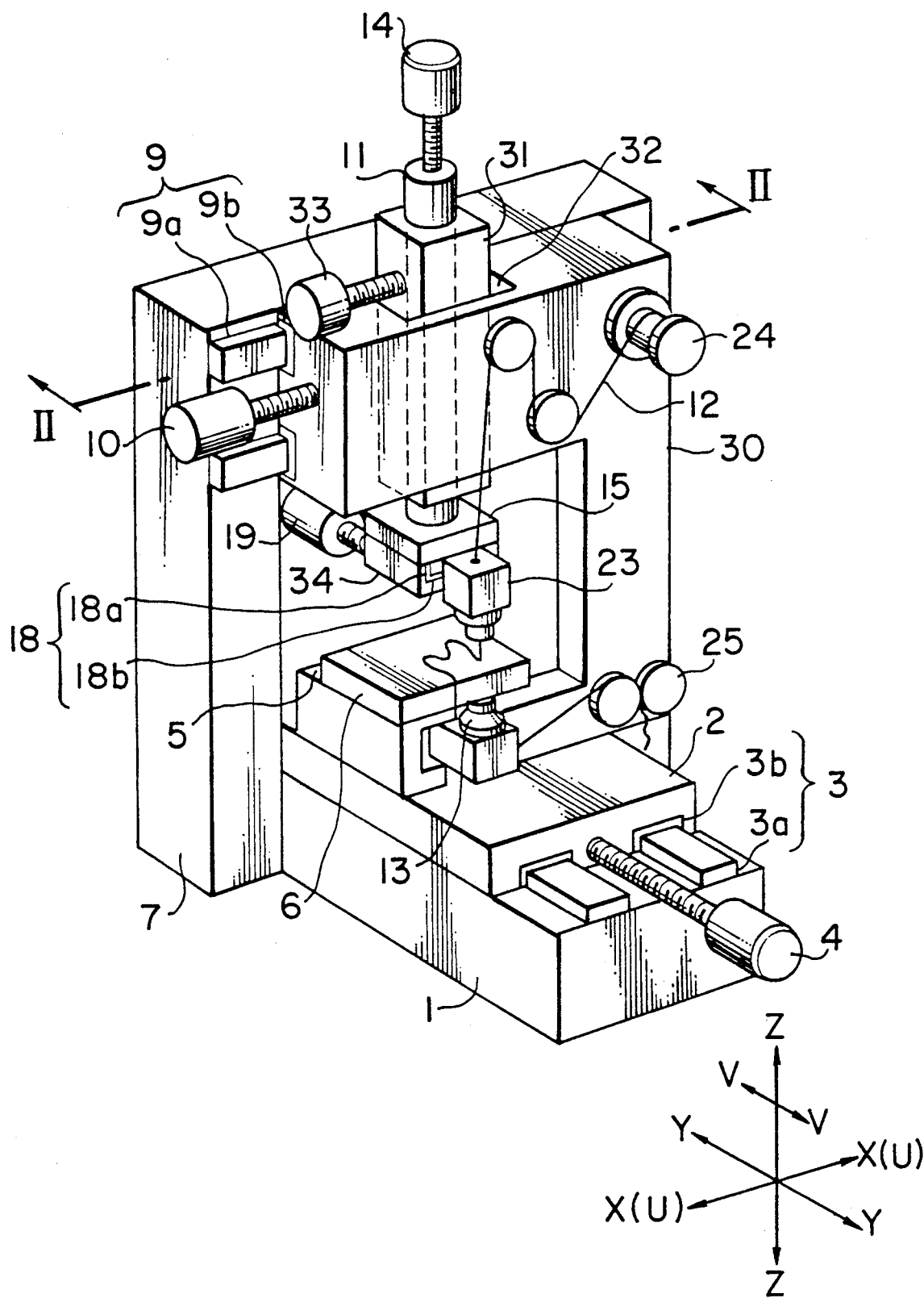
FIG. 1 is a perspective view showing a wire electric discharge machining apparatus in accordance with one embodiment of the invention.
Figure 2:
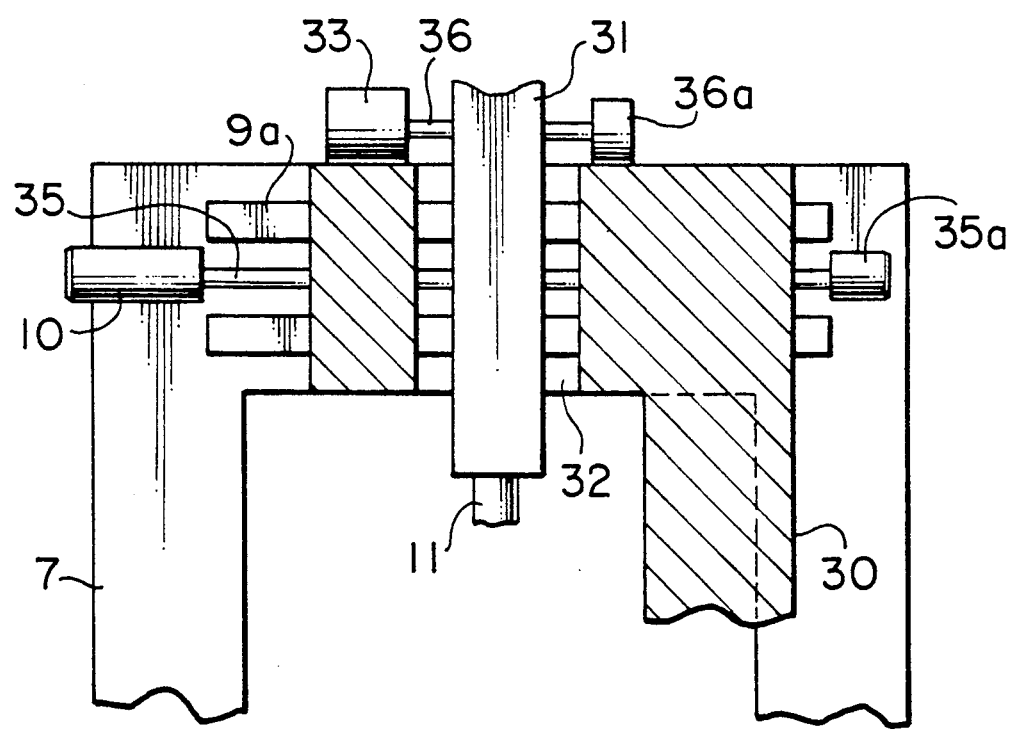
FIG. 2 is a cross-sectional view taken along the line II—II of FIG. 1.
Figure 3:
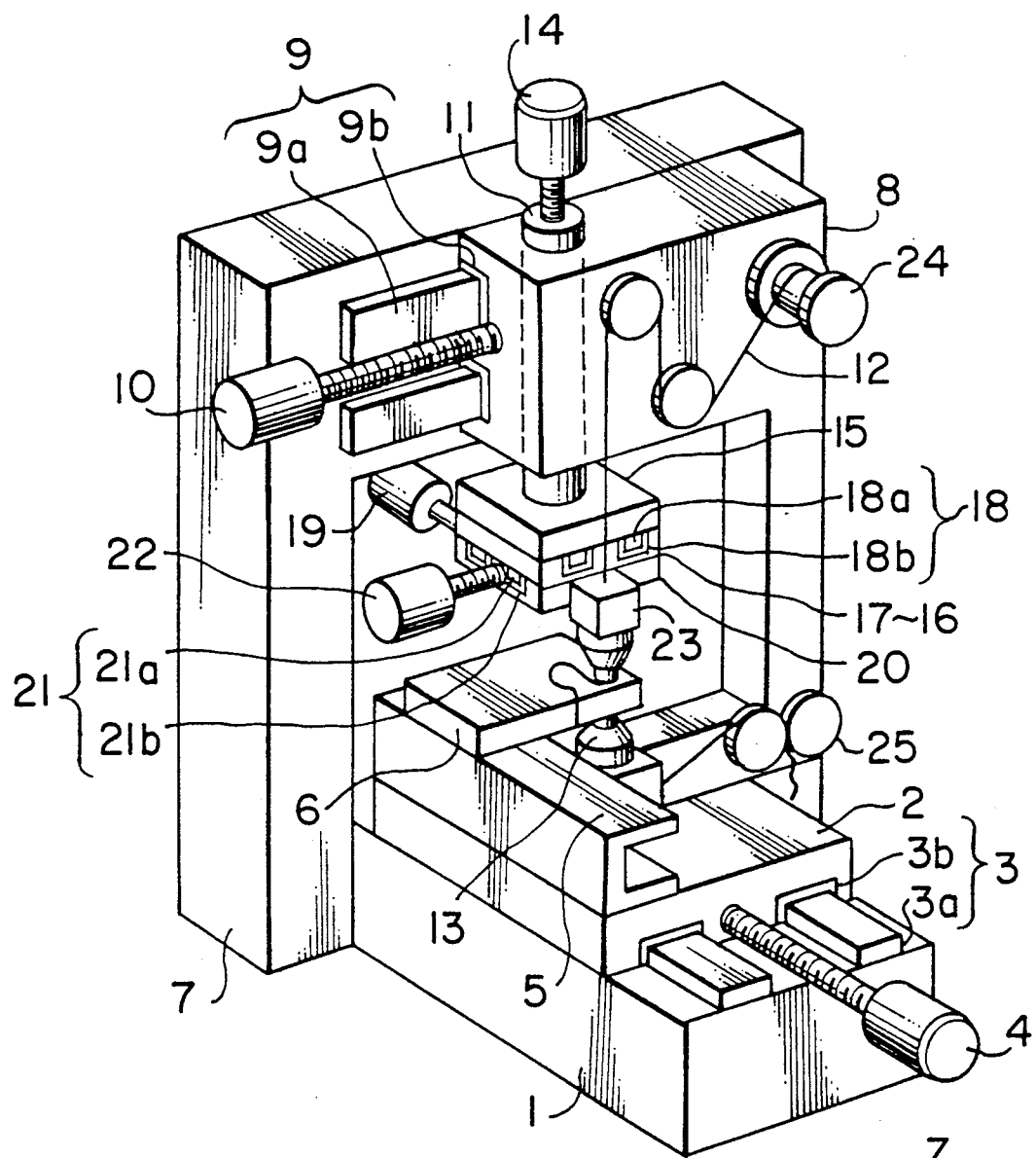
FIG. 3 is a perspective view showing a conventional apparatus.
Figure 3:
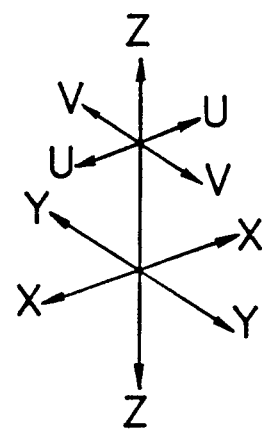

Referring now to the drawings wherein like reference numerals are used throughout the various views to designate like parts and, more particularly, to FIGS. 1 and 2, according to these figures, a wire electric discharging machining apparatus includes a frame 30 carrying thereon a pair of bearings 9b and is being guided by a pair of rails 9a. A feed screw 35 is connected to a motor 10 and is threadedly engaged with a nut (not shown) mounted on the frame 30. A bearing 35a for the feed screw 35 is mounted on the column 7. A U-axis moving means 31 is arranged inside a recess 32 formed in the frame 30. The U-axis moving means 31 is provided with the pair of bearings 9b and is guided by the rails 9a. A motor 33 provided with a brake is mounted on the frame 30. A feed screw 36 is connected to the motor 33 and is threadedly engaged with a nut (not shown) mounted on the U-axis moving means 31. A bearing 36a for the feed screw 36 is mounted on the frame 30. A center of movement of the U-axis moving means 31 is identical with the center position of the recess 32. Also, a Z-axis quill 11 is mounted on the U-axis moving means 31. A V-axis moving means 34 carries bearings 18b thereon and is guided by rails 18a. Also, the upper guide 23 is mounted on a flange 15 of the V-axis moving means 34.

The workpiece 6, having parallel upper and lower surfaces, is loaded on a loading surface 5 and the upper guide 23 is positioned in the reference position, i.e. the starting point of machining. The braking of the motor 33 is effected to thereby stop the rotation of the feed screw 36. Thus, the U-axis moving means 31 is kept in unison with the frame 30 through the feed screw 36. Subsequently, in order to prevent any electric discharge in the air and to remove sludge generated during the machining operation, a machining liquid is supplied from the upper guide 23 and the lower guide 13 in a coaxial manner with the wire 12. Then, electric power is supplied to the wire 12. The table 2 and the frame 30 are moved, respectively, so that the wire 12 and the workpiece 6 ar moved relative to each other in the X- and Y-axis directions, thereby performing the vertical machining.

In the same manner, the U-axis moving means 31 and the V-axis moving means 34 are operated, and the relative position of the upper guide 23 to the lower guide 13 is changed, thereby performing the inclined machining.

Instead of braking of the motor 33 to stop the rotation of the feed screw 36 and ensure that the U-axis moving means 31 and the frame 30 are moved in unison during the vertical machining, the feed screw 36 from rotating or any other suitable means may be used.

Although the motor 33 and the bearing 36a have been described as being mounted on the frame 30, it is also possible for the motor 33 and the bearing 36a to be mounted on the column 7 so that the U-axis moving means 31 and the frame 30 may be moved independently of each other.

It is possible to modify the apparatus so that the Z-axis quill 11 may be manually moved, and the linear guide means is not limited to a roll or ball guide means but may be of the sliding type.

As described above, according to the present invention, the upper guide 23 is positioned through the three guide means, i.e., the linear guide means 9 and 18 and the guide means for the Z-axis quill 11 with respect to the fixed column 7. Thus, the number of the guide means is reduced by one in comparison with the conventional apparatus. Furthermore, since the U-axis is identical with the X-axis and the linear guide means 9 may be used also as the linear guide means for the U-axis direction, the rigidity of the means is increased in comparison With the conventional one. Therefore, it is possible to increase the pressure of the machining liquid and to enhance the machining speed as well as the machining precision.

What is claimed is:

1. In a wire electric discharge machining apparatus in which a workpiece and a wire supported by a pair of guides are moved relative to each other in an X-axis direction and a Y-axis direction, one of said guides being moved relative to the other guide in two directions in a horizontal plane, the improvement comprising said pair of guides, a frame movable in the X-axis direction on a column, a table for mounting the workpiece and moving in the Y-axis direction on a base, rails mounted on the column, a U-axis moving means and a V-axis moving means in parallel with said Y-axis, and said frame and said U-axis moving means are arranged in alignment on the same rails.

2. In a wire electric discharge machining apparatus in which a workpiece and a wire supported by a pair of guides are moved relative to each other in an A-axis direction and a Y-axis direction, one of said guides being moved relative to the other guide in two directions in a horizontal plane, the improvement comprising said pair of guides, a frame moving in the X-axis direction on a column, a table for mounting the workpiece and moving in the Y-axis direction on a base, rails mounted on the column, a Z-axis quill, a U-axis moving means and a V-axis moving means, one of said guides being mounted on said frame, said V-axis moving means on which the other guide is mounted being mounted movably on said Z-axis quill in parallel with said Y-axis, said Z-axis quill being mounted movably on said U-axis moving means in the Z-direction, and said frame and said U-axis are arranged in alignment on the same rails.

3. The apparatus according to claim 1 or 2, wherein a drive means for said U-axis moving means is mounted on said frame so that said U-axis moving means is moved relative to said frame.

4. The apparatus according to claim 1 or 2, wherein a drive means for said U-axis moving means is mounted on said column so that said U-axis moving means is moved relative to said column.

5. A wire electric discharge machining apparatus comprising a frame means, a column means for supporting said frame means, a first guide means and a second guide means for supporting a wire, a V-axis moving means for moving in a V-axis direction in parallel to a Y-axis, a U-axis means for moving in a U-axis direction, a table means for supporting a work piece, rail means mounted on said column means, and wherein said frame means is movable in X-axis direction and said table means is movable in the Y-axis direction, said first guide means is mounted on said frame, said second guide means is mounted on said V-axis moving means, and said V-axis moving means is mounted on said U-axis moving means, and said frame means and said U-axis moving means are disposed in alignment with said rail means.

6. A wire electric discharge machining apparatus according to claim 5, further comprising a Z-axis quill means, said V-axis moving means being movably mounted on said Z-axis quill means in parallel with said Y-axis, and wherein said Z-axis quill means is movably mounted on said U-axis moving means for movement in a Z-direction.

7. A wire electric discharge machining apparatus according to one of claim 5 or 6, wherein said frame means includes a recess means for accommodating said U-axis moving means, and wherein a center of movement of said U-axis moving means is substantially coincidential with a center position of said recess means.

8. A wire electric discharge machining apparatus according to claim 7, wherein a drive means for said U-axis moving means is mounted on said frame means for enabling said U-axis moving means to be moved relative to said frame means.

9. A wire electric discharge machining apparatus according to claim 7, wherein a drive means for said U-axis moving means is mounted on said column means for enabling the U-axis moving means to be moved relative to said column means.

* * * * *